United States Patent
Inagaki et al.

(10) Patent No.: US 7,573,275 B2
(45) Date of Patent: Aug. 11, 2009

(54) TEMPERATURE SENSOR CONTROL APPARATUS

(75) Inventors: Hiroshi Inagaki, Aichi (JP); Yuji Oi, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 533 days.

(21) Appl. No.: 11/509,566

(22) Filed: Aug. 25, 2006

(65) Prior Publication Data

US 2007/0046419 A1 Mar. 1, 2007

(30) Foreign Application Priority Data

Aug. 31, 2005 (JP) ............... 2005-251856

(51) Int. Cl.
*G01R 27/08* (2006.01)
(52) U.S. Cl. ..................... 324/721; 73/23.25
(58) Field of Classification Search ............... 324/721, 324/713, 462, 468; 73/23.25, 54.16, 54.43
See application file for complete search history.

(56) References Cited

U.S. PATENT DOCUMENTS

| | | | |
|---|---|---|---|
| 7,375,498 B2 * | 5/2008 | Yamamoto | 320/150 |
| 7,482,816 B2 * | 1/2009 | Odajima et al. | 324/548 |
| 2005/0134232 A1 * | 6/2005 | Yamamoto | 320/150 |
| 2005/0274187 A1 * | 12/2005 | Zhao et al. | 73/514.16 |

FOREIGN PATENT DOCUMENTS

| | | |
|---|---|---|
| JP | 5-45231 A | 2/1993 |
| JP | 2002-310807 A | 10/2002 |

* cited by examiner

*Primary Examiner*—Vincent Q Nguyen
(74) *Attorney, Agent, or Firm*—Sughrue Mion, PLLC (57) ABSTRACT

A temperature sensor control apparatus includes a reference potential section, a driving potential section set to a driving electric potential, a temperature sensor configured to vary a resistance in accordance with a temperature, and disposed between the reference potential section and the driving potential section, a conduction path, two reference resistance elements each connected in series with the temperature sensor, a potential controlled point disposed in the conduction path between the reference resistance elements, a potential setting section configured to set an electric potential of the potential controlled point to the driving electric potential; and a resistance switching control section configured to control the potential setting section to switch the electric potential of the potential controlled point, and to switch each of the reference resistance elements to one of an energized state and a deenergized state.

14 Claims, 7 Drawing Sheets

TEMPERATURE SENSOR CONTROL APPARATUS

BACKGROUND OF THE INVENTION

The present invention relates to a temperature sensor control apparatus which energizes a temperature sensor whose electric resistance varies in accordance with a temperature.

Heretofore, there is used a temperature sensor control apparatus arranged to energize a temperature sensor whose resistance varies in accordance with a temperature, at a temperature detection of a measured fluid such as exhaust gas by using the temperature sensor.

The temperature sensor control apparatus includes reference resistance elements connected in series with the temperature sensor. The temperature sensor control apparatus senses a voltage value divided by the resistances with respect to an impressed voltage (that is, an electric potential of a connection point between the temperature sensor and the reference resistance element), and determines a resistance value of the temperature sensor in accordance with the electric potential of the connection point. This temperature sensor control apparatus determines the temperature based on temperature-resistance characteristic of the temperature sensor.

The temperature sensor has a characteristic having a region in which an amount of variation of the resistance value is small with respect to an amount of variation of the temperature, and a region in which an amount of variation of the resistance value is increased with respect to an amount of variation of the temperature. Accordingly, the amount of variation of the resistance value is not constant in all the temperature region. In the region in which the amount of the variation in the resistance value is small with respect to the amount of the variation in the temperature, the sensed voltage value divided by the resistance tends to vary for the noise, so that the detection error tends to occur in this region.

For solving the above mentioned problem, a published Japanese patent application No. H5-45231 and a published Japanese patent application No. 2002-310807 disclose temperature sensor control apparatuses devised to decrease the resistance value of the reference resistance elements relatively with respect to the temperature sensor by switching the reference resistance elements connected in series with the temperature sensor. Accordingly, it is possible to decrease the influence of the noise.

SUMMARY OF THE INVENTION

However, the conventional temperature sensor control apparatus is arranged to switch the reference resistance elements by using a switching section (a change-over switch) connected in series with the reference resistance element, and the current flowing through the temperature sensor and the reference resistance elements flows through the switching section (the change-over switch). In this arrangement, at the detection of the electric potential of the connection point between the temperature sensor and the reference resistance element (the voltage divided by the resistances), the accuracy of the divided voltage value may be decreased by the effect of the resistance value (impedance) of the switching section (the change-over switch).

That is, the current flowing through the temperature sensor and the reference resistance elements also flows through the switching section (the change-over switch), and accordingly it is necessary not to sense the voltage divided by the reference resistance elements and the temperature sensor, but to sense the voltage value divided by the reference resistance elements, the temperature sensor, and the switching section.

However, in a case in which the impedance of the switching section is not considered, the variation in the resistance value (serving as the reference resistance) dividing the voltage with respect to the temperature sensor may generate by the influence of the impedance of the switching section (the change-over switch), and the accuracy of the detection of the divided voltage and the accuracy of the detection of the temperature may be decreased.

Figure 6:
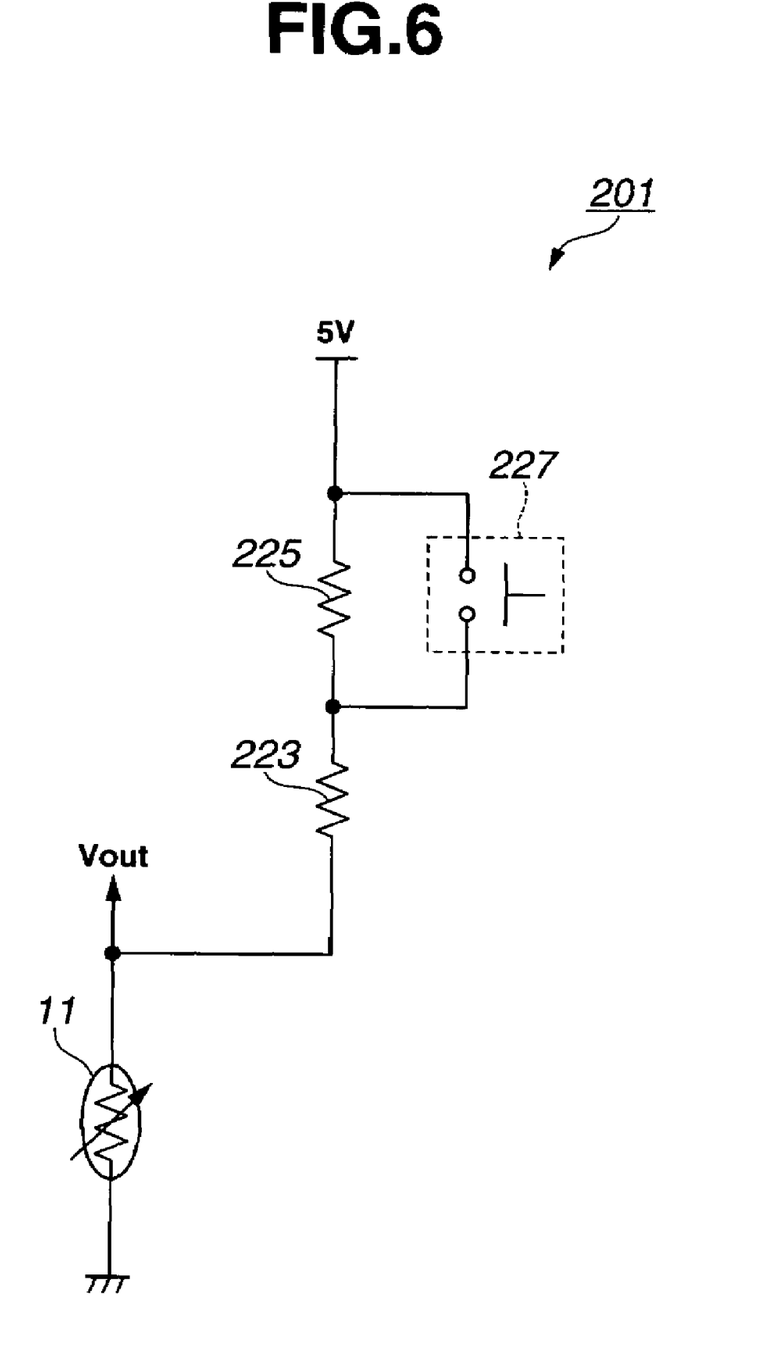
FIG. 6 is a schematic diagram showing main part of a temperature sensor control apparatus of earlier technology which has a change-over switch connected in parallel with a reference resistance element.

FIG. 6 is a schematic view showing a conventional temperature sensor control apparatus 201 including a temperature sensor 11, two reference resistance elements 223 and 225 which are connected in series with each other, and a change-over switch 227 connected in parallel with reference resistance element 225.

Conventional temperature sensor control apparatus 201 is arranged to change the resistance value of the reference resistance elements used for the voltage dividing by the resistances. In this conventional temperature sensor control apparatus 201, the resistance value of reference resistance element 223 is 300 [Ω], and the resistance value of reference resistance element 225 is 14.7 [kΩ].

Figure 7:
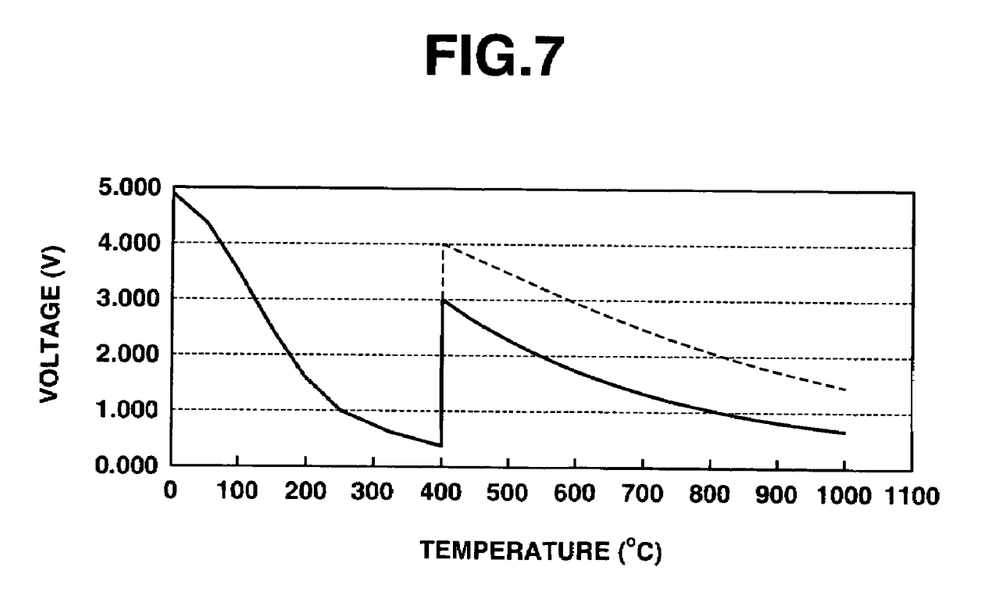
FIG. 7 is a graph showing a measured data of a relationship between a divided voltage of the temperature sensor of FIG. 6 and temperature when an internal resistance of the change-over switch is 500 [Ω] and 0[Ω].

FIG. 7 is a graph showing a measured data of a relationship between a divided voltage Vout of temperature sensor 11 and the temperature in a case in which the internal resistance of change-over switch 227 is 500 [Ω] and in a case in which the internal resistance of change-over switch 227 is 0 [Ω], in conventional temperature sensor control apparatus 20. In FIG. 7, a solid line shows the case in which the internal resistance of change-over switch 227 is 500 [Ω], and a broken line shows the case in which the internal resistance of change-over switch is 0 [Ω]. The measured data as shown in FIG. 7 is a data which change-over switch 227 is brought to an open state in a temperature region equal to or smaller than 400 [° C.], and which change-over switch 227 is brought to a closed state in a temperature region greater than 400 [° C.].

As shown in FIG. 7, a graph which the internal resistance of change-over switch 227 is 500 [Ω] is identical to a graph which the internal resistance of change-over switch 227 is 0 [Ω], in the temperature region equal to or smaller than 400 [° C.]. Accordingly, it is understood that there is no influence of the internal resistance of change-over switch 227. However, a graph which the internal resistance of change-over switch 227 is 500 [Ω] is different from a graph which the internal resistance of change-over switch 227 is 0 [Ω], in the temperature region greater than 400 [° C.]. Accordingly, it is understood that there is an influence of the difference between the internal resistances of change-over switch 227, in the temperature region greater than 400 [° C.].

It is an object of the present invention to provide a temperature sensor control apparatus arranged to accurately judge a state of a conduction path including a temperature sensor at a start of the temperature sensor.

According to one aspect of the present invention, a temperature sensor control apparatus comprises: a reference potential section set to a reference electric potential; a driving potential section set to a driving electric potential different from the reference electric potential; a temperature sensor configured to vary a resistance in accordance with a temperature of a fluid, and disposed between the reference potential section and the driving potential section for being energized; a conduction path extending from the driving potential section through the temperature sensor to the reference potential section; at least two reference resistance elements each disposed in the conduction path to be connected in series with the temperature sensor; a potential controlled point disposed in the conduction path between the reference resistance elements; a potential setting section configured to set an electric potential of the potential controlled point to the driving electric potential; and a resistance switching control section configured to control the potential setting section to switch the electric potential of the potential controlled point, and to switch each of the reference resistance elements to one of an energized state and a deenergized state.

DETAILED DESCRIPTION OF THE INVENTION

Figure 1:
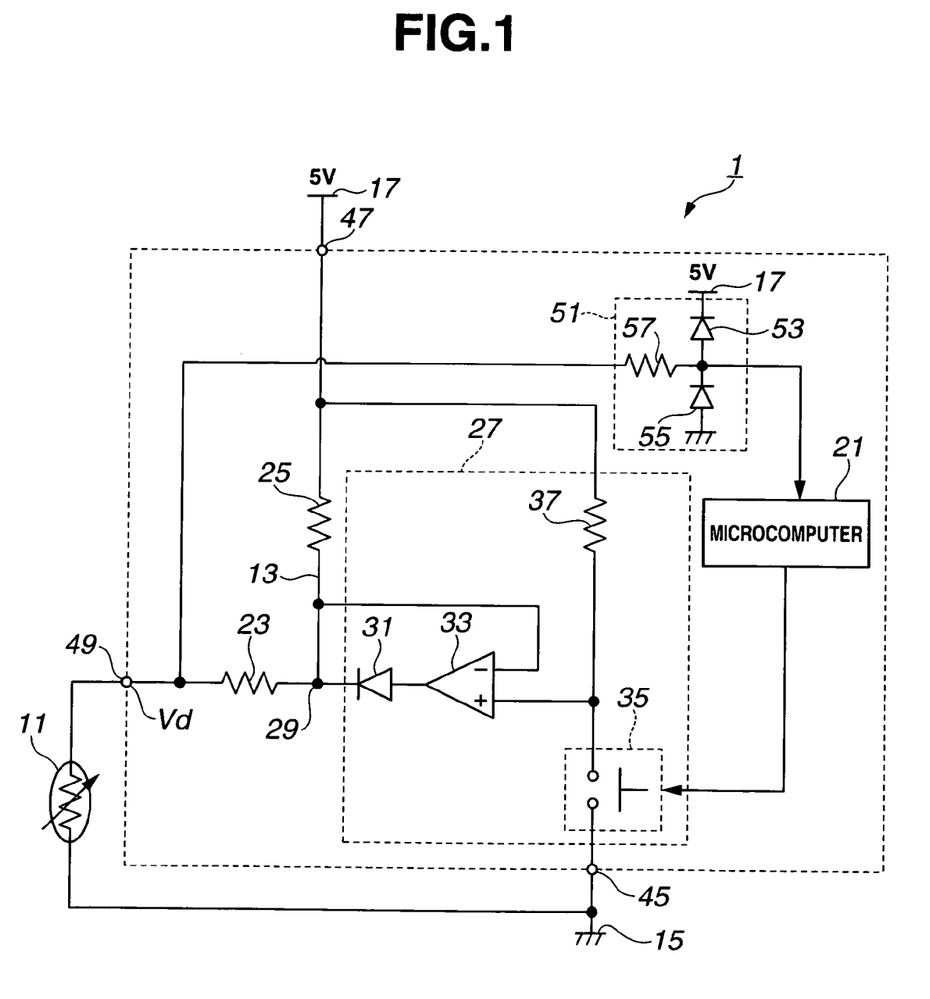
FIG. 1 is a schematic electric circuit diagram showing a temperature sensor control system according to a first embodiment of the present invention.

FIG. 1 shows a schematic electric circuit diagram showing a temperature sensor control apparatus 1 according to a first embodiment of the present invention. Temperature sensor control apparatus 1 is used for controlling the temperature sensor arranged to sense temperature of a measured fluid such as exhaust gas of an internal combustion engine of a vehicle. A temperature sensor 11 connected with temperature sensor control apparatus 1 has a characteristic to vary electric resistance in accordance with the temperature. That is, temperature sensor 11 has a negative characteristic in which the electric resistance decreases as the temperature of the measured fluid is increased.

Temperature sensor control apparatus 1 includes a microcomputer 21 arranged to perform various control operations, a reference potential terminal 45 set to a reference potential (0 [V] in the first embodiment), a driving potential terminal 47 set to a driving potential (5 [V] in the first embodiment), a temperature sensor connection terminal 49 connected with temperature sensor 11, a conduction path 13 extending from driving potential terminal 47 through temperature sensor connection terminal 49 to reference potential terminal 45, a first reference resistance element (first reference resistor) 23 and a second reference resistance element (second reference resistor) 25 each disposed in conduction path 13 to be connected in series with temperature sensor 11, a potential-controlled point (a potential set point) 29 disposed in conduction path 13 between first reference resistance element 23 and second reference resistance element 25, and a potential setting circuit 27 arranged to set an electric potential of potential-controlled point 29.

Microcomputer 21 performs various control operations for temperature detection. Microcomputer 21 has a main part including a central processing unit (CPU), a random access memory (RAM), a read only memory (ROM), and an input/output section. The input/output section of microcomputer 21 is connected with various parts so as to receive the electric potential of temperature sensor connection terminal 49, and to output a command signal to potential setting circuit 27 (that is, a potential setting switch 35 as described later).

An analog signal inputted to the input/output section is converted, by an analog to digital (A/D) conversion section (converter), to a digital signal which the CPU can use. Reference potential terminal 45 is connected with a reference potential line 15 whose an electric potential is identical to the electric potential of an output terminal of a low potential side (an electric potential of 0 [V]) of a power supply (not shown, an output voltage 5 [V] in the first embodiment). Driving potential terminal 47 is connected with a driving potential line 17 whose an electric potential is identical to an electric potential of an output terminal of a high potential side (an electric potential of 5 [V]) of the power supply.

The power supply supplies electric power to temperature sensor control apparatus 1 and other devices of the internal combustion engine. Temperature sensor connection terminal 49 is connected with one end of temperature sensor 11, and the other end of temperature sensor 11 is connected with reference potential line 15 (that is, reference potential terminal 45). That is, temperature sensor 11, first reference resistance element 23, and second reference resistance element 25 are connected in series with one another in conduction path 13 connecting reference potential terminal 45 (reference potential line 15) and driving potential terminal 47 (driving potential line 17).

First reference resistance element 23 is composed of a resistance element of 300 [Ω]. Second reference resistance element 25 is composed of a resistance element of 15 [kΩ]. The input/output section of microcomputer 21 is connected with a signal path provided with a clamping circuit 51 arranged to limit voltage range of the input signal to a predetermined voltage range (0~5 [V] in the first embodiment). Clamping circuit 51 includes a first clamping diode 53, a second clamping diode 55, and a clamping resistance element (clamping resistor) 57.

Clamping resistance element 57 is connected in series with the signal path connecting the input/output section of microcomputer 21 and temperature sensor connection terminal 49. First clamping diode 53 includes an anode connected with one end of clamping resistance element 57 (that is, an end connected with the input/output section of microcomputer 21), and a cathode connected with driving potential line 17. Second clamping diode 55 includes an anode connected with reference potential line 15, and a cathode connected with the one end of clamp resistance element 57 (that is, the end connected with the input/output section of microcomputer 21).

Potential setting circuit 27 includes a setting diode 31, an operational amplifier 33, a setting resistance element (setting resistor) 37, and a potential setting switch 35. Setting diode 31 includes an anode, and a cathode connected with potential-controlled point 29. Operational amplifier 33 includes an output terminal connected with the anode of setting diode 31, an inverting input terminal (−) connected with the cathode of setting diode 31, and non-inverting input terminal (+). Setting resistance element 37 is disposed between the non-inverting input terminal (+) of operational amplifier 33 and driving potential terminal 45. Potential setting switch 35 is disposed between the non-inverting input terminal (+) of operational amplifier 33 and reference potential terminal 45.

Potential setting switch 35 is arranged to set the electrical connection between the non-inverting input terminal (+) of operational amplifier 33 and reference potential terminal 45 to a conduction state (continuity state) or a breaking state (interrupting state) in accordance with a command signal from microcomputer 21.

When potential setting switch 35 is set to the conduction state based on the command signal from microcomputer 21, driving potential terminal 47 is electrically connected with reference potential terminal 45 thorough setting resistance element 37 and potential setting switch 35. Consequently, non-inverting input terminal (+) of operational amplifier 33 receives reference electric potential (0 [V]). Moreover, the inverting input terminal (−) of operational amplifier 33 receives the electric potential (the electric potential greater than the reference electric potential) of potential-controlled point 29 in conduction path 13.

In this state, operational amplifier 33 outputs, from the output terminal, the electric potential lower than the electric potential of potential-controlled point 29. In a case in which operational amplifier 33 outputs, from the output terminal, the electric potential lower than the electric potential of potential-controlled point 29, setting diode 31 resists the electric current from flowing from potential-controlled point 29 to the output terminal of operational amplifier 33. Accordingly, setting circuit 27 is not affected by the electric potential of potential-controlled point 29, and the electric potential of potential-controlled point 29 is set based on the voltage divided by the reference resistance elements (first reference resistance element 23 and second reference resistance element 25) and temperature sensor 11.

On the other hand, when potential setting switch 35 is set to the breaking state based on the command signal from microcomputer 21, and the non-inverting input terminal (+) of operational amplifier 33 receives the driving electric potential (5 [V]). Consequently, operational amplifier 33 outputs the voltage from the output terminal so as to set the electric potential of potential-controlled point 29 connected with the inverting input terminal (+), to the driving electric potential (5 [V]).

In this state, the electric current does not flow through second reference resistance element 25 (that is, the reference resistance element connected between driving potential terminal 47 and potential-controlled point 29 set to the driving electric potential) of the two reference resistance elements (first reference resistance element 23 and second reference resistance element 25), and the electric current flows in a direction from potential-controlled point 29 through first reference resistance element 23 to reference potential terminal 45. That is, the electric current flows through first reference resistance element 23 and temperature sensor 11 which are disposed between reference potential line 15 and potential-controlled point 29 set to the driving electric potential.

In this way, potential setting circuit 27 is arranged to switch potential-controlled point 29 to an arbitrary state or a fixed potential state (a forced state) in accordance with the command signal from microcomputer 21. In the arbitrary state, the electric potential of potential-controlled point 29 is set based on the voltage divided by the reference resistance element and temperature sensor 11. In the fixed potential state, the electric potential of potential-controlled point 29 is forcibly set to the driving electric potential.

Accordingly, it is possible to forcibly switch the electric potential of potential-controlled point 29 to the driving electric potential (5 [V]), by using potential setting circuit 27. Moreover, it is possible to change the number of the energized reference resistance elements of the two reference resistance elements (first reference resistance element 23 and second reference resistance element 25).

Figure 2:
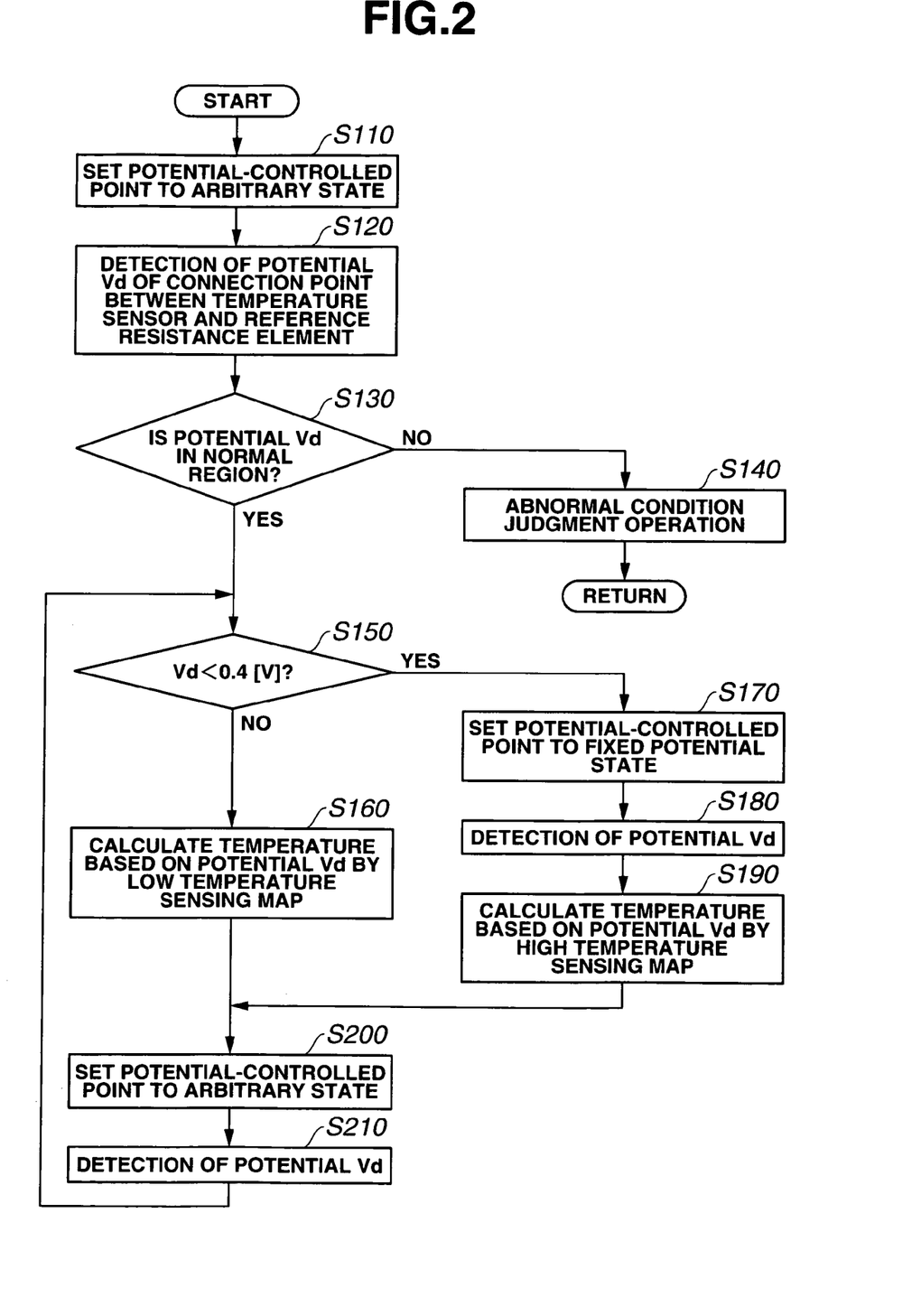
FIG. 2 is a flow chart showing a temperature sensing main control process performed by the temperature sensor control apparatus of FIG. 1.

FIG. 2 shows a flow chart showing a temperature sensing main control process performed in microprocessor 21. The temperature sensing main control process is started when temperature sensor control apparatus 1 is started.

After the start of the process, microcomputer 21 performs an operation to bring the electric potential of potential-controlled point 29 to the arbitrary state at step S110. That is, microcomputer 21 outputs the command signal to bring potential setting switch 35 to the conduction state.

When potential setting switch 35 is set to the conduction state, the electric potential of potential-controlled point 29 is not forcibly set by potential setting circuit 27, and is brought to the arbitrary state as described above. That is, the electric potential of potential-controlled point 29 is set to an arbitrary value in accordance with the voltage divided by the reference resistance elements (first reference resistance element 23 and second reference resistance element 25) and temperature sensor 11 without suffering from the influence of potential setting circuit 27.

At step S120, microcomputer 21 performs an operation to sense an electric potential Vd of temperature sensor connection terminal 49 (that is, an electric potential Vd of a connection point between temperature sensor 11 and reference resistance element 23). That is, microcomputer 21 performs an operation to receive the electric potential (analogue signal) of temperature sensor connection terminal 49 through the input/output section of microcomputer 21, and performs analog/digital (A/D) conversion to convert the received analogue signal to a digital signal.

Temperature sensor 11 includes a first end connected with temperature sensor connection terminal 49, and a second end connected with reference potential line 15 (reference potential terminal 45). The electric potential of temperature sensor connection terminal 49 corresponds to the electric potential of the connection point (junction point) between temperature sensor 11 and first reference resistance element 23.

At step S130, microcomputer 21 judges whether electric potential Vd of temperature sensor connection terminal 49 which is sensed at step S120 is in a predetermined normal range or not. Microcomputer 21 makes an affirmative judgment (YES) in a case in which electric potential Vd is in the normal region, and the process proceeds to step S150. Microcomputer 21 makes a negative judgment (NO) in a case in which electric potential Vd is out of the normal region, and the process proceeds to step S140.

The normal range is a predetermined range in which electric potential Vd of temperature sensor connection terminal 49 can be developed in accordance with the temperature range of the measured fluid. That is, when the measured fluid can be developed in a range of 0~1000 [° C.], the normal range is a range in which electric potential Vd of temperature sensor connection terminal 49 (electric potential Vd of the connection point of temperature sensor 11 and first reference resistance element 23) can cover in accordance with the temperature range of 0~1000 [° C.].

Subsequently to the negative judgment at step S130, microcomputer 21 judges an abnormal condition of conduction path 13 at step S140, and informs users of temperature sensor control apparatus 1 of the abnormal condition of conduction path 13.

The abnormal conditions of conduction path 13 include a breaking (disconnection) abnormal condition of conduction path 13, and a battery short circuit abnormal condition in which conduction path 13 including temperature sensor 11 is short-circuited with a battery power supply (not shown). In these abnormal conditions, electric potential Vd of temperature sensor connection terminal 49 (the electric potential of the connection point of temperature sensor 11 and first reference resistance element 23) is always in (sticks to) the high electric potential (5 [V] or above). However, in the normal condition, electric potential Vd of temperature sensor connection terminal 49 (the electric potential of the connection point between temperature sensor 11 and first reference resistance element 23) is always in a range of 0.1~4.9 [V]. Accordingly, when electric potential Vd is always in 5 [V], it is possible to judge deviation from the normal range.

Moreover, there is a ground short circuit abnormal condition in which conduction path 13 including temperature sensor 11 is connected with reference potential line 15. In this ground short circuit abnormal condition, electric potential Vd of temperature sensor connection terminal 49 (the electric potential of the connection point between temperature sensor 11 and first reference resistance element 23) is always in 0 [V]. However, in the normal condition, electric potential Vd of temperature sensor connection terminal 49 (the electric potential of the connection point between temperature sensor 11 and first reference resistance element 23) is always in the range of 0.1~4.9 [V]. When electric potential Vd is in 0 [V], it is possible to judge the deviation from the normal range.

Subsequently to the affirmative determination at step S130, microcomputer 21 judges whether the sensed electric potential Vd is smaller than 0.4 [V] or not at step S150. Microcomputer 21 makes an affirmative judgment (YES) in a case in which electric potential Vd is smaller than 0.4 [V], the process proceeds to step S170. Microcomputer 21 makes a negative judgment (NO) in a case in which electric potential Vd is equal to or greater than 0.4 [V], and the process proceeds to step S160.

Besides, in a case in which an operation at step S210 has performed as described later, electric potential Vd for the judgment at step S150 is not electric potential Vd sensed at step S120, and is electric potential Vd sensed at step S210.

Subsequently to the negative judgment at step S150, microcomputer 21 determines, at step S160, the temperature by using a low temperature sensing map in accordance with electric potential Vd sensed at step S120. In a case in which the operation at step S210 is performed as described later, electric potential Vd used at step S160 is not electric potential Vd sensed at step S120, and is electric potential Vd sensed at step S210.

The low temperature sensing map shows a relationship between electric potential Vd and the temperature of temperature sensor 11. The low temperature sensing map can be drawn based on measured data. In temperature sensor control apparatus 1 according to the first embodiment, the temperature region which can be sensed by using the low temperature sensing map is set to the range of 0~400 [° C.].

Figure 3A:
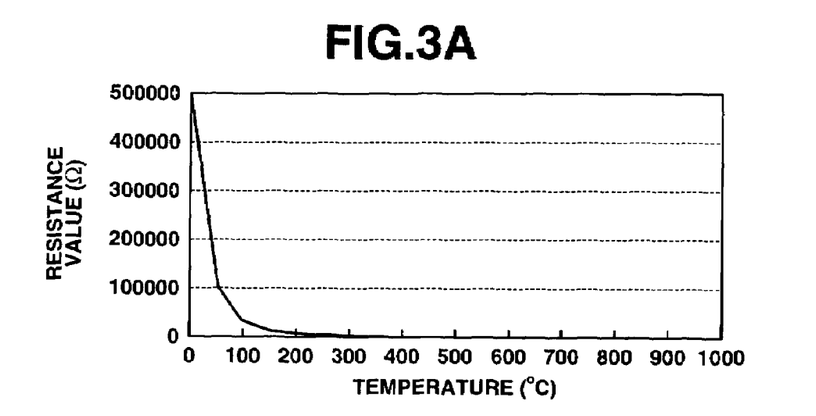
FIGS. 3A, 3B and 3C are graphs showing measured data about a temperature sensor of the temperature sensor control apparatus of FIG. 1.
Figure 3B:
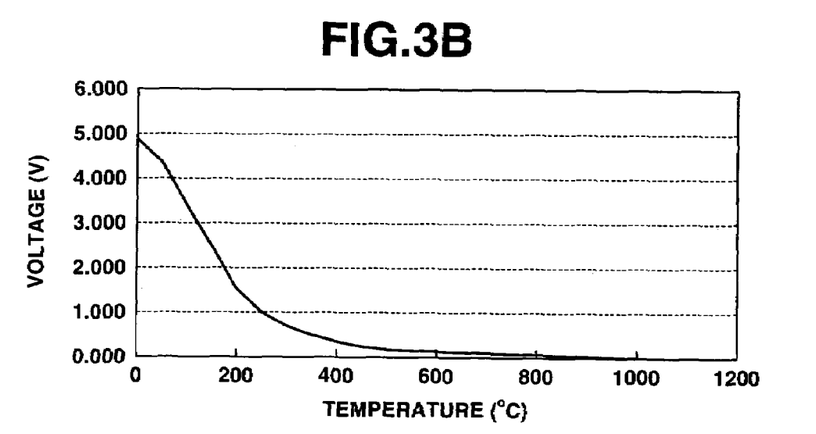
Figure 3C:
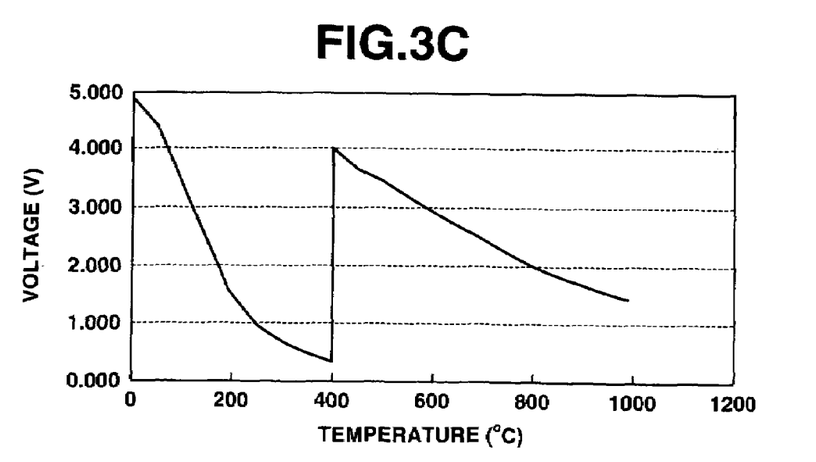

FIGS. 3A, 3B, and 3C show graphs drawn by using measured data. FIG. 3A is the graph showing a relationship between the temperature and the resistance value of temperature sensor 11. FIG. 3B is the graph showing a relationship between the temperature and the voltage across temperature sensor 11 which is divided by the reference resistance elements, without switching of the reference resistance elements. FIG. 3C is the graph showing relationship between the temperature and the voltage across temperature sensor 11 which is divided by the reference resistance elements, with switching of the reference resistance elements.

Temperature sensor 11 according to the first embodiment includes a thermistor element having composition of (Sr, Y) (Al, Mn, Fe) $O_3$. As shown in FIG. 3A, temperature sensor 11 has a negative characteristic in which the electric resistance is decreased as the temperature is increased.

In a series circuit including temperature sensor 11 and the reference resistance elements (first reference resistance element 23 and second reference resistance element 25), an impressed voltage (difference between the driving electric potential and the reference electric potential) is constant, and the electric resistance of the reference resistance elements (first reference resistance element 23 and second reference resistance element 25) is constant. Accordingly, electric potential Vd of temperature sensor connection terminal 49 (that is, the voltage across temperatures sensor 11 which is divided by the reference resistance elements) is determined in accordance with the resistance of temperature sensor 11. FIG. 3B is the measured data showing the above-mentioned relationship between the temperature and the voltage across temperature sensor 11 which is divided by the reference resistance elements.

However, in the measured data shown in FIG. 3B, the amount of the variation in electric potential Vd (the dividing voltage) of temperature sensor connection terminal 49 is small with respect to the variation in the temperature, at the high temperature region (for example, a temperature region greater than 400 [° C.]). Accordingly, it is problematic to increase the detection error of the temperature detection for the influence of the noise.

On the other hand, in the measured data of FIG. 3C, the only first reference resistance element 23 of the two reference resistance elements is used for decreasing the resistance of the reference resistance elements in the temperature region greater than 400 [° C.], so that electric potential Vd of temperature sensor connection terminal 49 (that is, the voltage across temperature sensor 11 which is divided by the reference resistance elements) is increased. Accordingly, it is possible to increase the amount of the variation in electric potential Vd (the divided voltage) of temperature sensor connection terminal 49 with respect to the variation in the temperature even in the temperature region above 400 [° C.], and to decrease the detection error of the temperature detection by the effect of the noise and so on.

In temperature sensor control apparatus 1 according to the first embodiment, the low temperature sensing map is formed based on the measured data of 0~400 [° C.] shown in FIG. 3C, and a high temperature sensing map as described later is formed based on the measured data of 400~1000 [° C.] shown in FIG. 3C.

In the flow chart of FIG. 2, subsequently to the affirmative judgment at step S150, microcomputer 21 performs an operation to set the electric potential of potential-controlled point 29 to the fixed potential state at step S170. That is, microcomputer 21 outputs the command signal to set potential setting switch 35 to the breaking state.

When potential setting switch 35 is set to the breaking state, potential setting circuit 27 forcibly sets the electric potential of potential-controlled point 29 to the driving electric potential (5 [V] in the first embodiment) as described above. In this state, the electric current does not flow through second reference resistance element 25 of the two reference resistance elements (first reference resistance element 23 and second reference resistance element 25), and flows through potential-controlled point 29 and first reference resistance element 23. That is, the electric current flows through first reference resistance element 23 and temperature sensor 11 which are disposed between reference potential line 15 and potential-controlled point 29 set to the driving electric potential.

At step S180, microcomputer 21 performs the operation to sense electric potential Vd of temperature sensor connection terminal 49. The operation at step S180 is identical to the operation at step S120. At step S190, microcomputer 21 calculates the temperature based on electric potential Vd sensed at step S180 by using the high temperature sensing map.

The high temperature sensing map shows the relationship between electric potential Vd of temperature sensor connection terminal 49 and the temperature of temperature sensor 11. The high temperature sensing map can be made based on the measured data shown in FIG. 3C. In the temperature sensor according to the first embodiment, the temperature region which can be sensed by using the high temperature sensing map is the temperature region of 400~1000 [° C.].

The temperature calculated at step S160 or step S190 is stored in a memory section (such as a memory) of microcomputer 21, and is used for various control operations. Besides, the temperature stored in the memory section is updated at every operation of step S160 and step S190.

After the operation at step S160 or step S190, the process proceeds to step S200. At step S200, microcomputer 21 performs the operation to set the electric potential of electric potential-controlled point 29 to the arbitrary state. The operation at step S200 is identical to the operation at step S110.

At step S210, microcomputer 21 performs the operation to sense electric potential Vd of temperature sensor connection terminal 49 (that is, electric potential Vd of the connection point between temperature sensor 11 and first reference resistance element 23). The operation at step S210 is identical to the operation at step S120.

After the operation at step S210, the process returns to step S150. Then, microcomputer 21 performs operations of step S150 or later, and repeats the temperature sensing process by using temperature sensor 11.

As illustrated above, temperature sensor control system 1 is arranged to switch the electric potential of potential-controlled point 29 to the two state (the arbitrary state and the fixed potential state). Accordingly, it is possible to switch the number of the reference resistance elements connected in series with temperature sensor 11, by changing the electric potential of potential-controlled point 29. When the electric potential of potential-controlled point 29 is set to the driving electric potential (that is, when potential-controlled point 29 is set to the fixed potential state), the electric current flows only through first reference resistance element 23 of the two reference resistance elements (first reference resistance element 23 and second reference resistance element 25) which is disposed between potential-controlled point 29 and temperature sensor 11.

In this way, temperature sensor control apparatus 1 forcibly switches the electric potential of potential-controlled point 29, and it is possible to change the number of the reference resistance elements used for dividing the voltage with temperature sensor 11. Accordingly, it is possible to decrease the resistance value of the reference resistance elements which divides the voltage with temperature sensor 11, by changing the number of the reference resistance elements from two to one, and thereby to increase the electric current flowing through temperature sensor 11. Therefore, it is possible to decrease the effect of the noise, even in the region in which the detection error tends to be incurred by the effect of the noise at the temperature detection which is performed by using variation in the resistance of temperature sensor 11.

In temperature sensor control device 1, the switching section (a change-over switch) is not connected in series with temperature sensor 11 (that is, the switching section is not disposed in conduction path 13).

In the arrangement mentioned above, the electric current flowing through temperature sensor 11 does not flow through the switching section at the temperature detection. Accordingly, it is possible to prevent the variation in the resistance for dividing the voltage, by the effect of impedance of the switching section at the detection of the divided voltage of temperature sensor 11.

In temperature sensor control device 1 according to the first embodiment, the detection error is not incurred by the effect of the switching section (the change-over switch) at the detection of electric potential Vd of temperature sensor connection terminal 49. Accordingly, it is possible to prevent the accuracy in the temperature detection from decreasing.

When the series circuit including temperature sensor 11 and the reference resistance elements (that is, conduction path 13) is in the abnormal condition (the disconnection abnormal condition and the short circuit abnormal condition), electric potential Vd of temperature sensor connection terminal 49 (that is, electric potential Vd of the connection point between temperature sensor 11 and first reference resistance element 23) becomes the abnormal value.

In the illustrated embodiment, when electric potential Vd is out of the normal region (the negative judgment at step S130), temperature sensor control device 1 performs an abnormal condition judgment operation, and stops the temperature sensing operation. Accordingly, it is possible to judge the state (the normal state or the abnormal state) of conduction path 13 at the start of temperature sensor control apparatus 1.

In temperature sensor control apparatus 1, reference potential terminal 45 corresponds to a reference potential section, driving potential terminal 47 corresponds to a driving potential section, potential setting circuit 27 corresponds to a potential setting section, microcomputer 21 corresponds to a resistance switching control section, and potential setting switch 35 corresponds to a potential setting switching section. Moreover, step S110 of the temperature detection main control operation corresponds to a start voltage applying section. Step S120, step S180 and step S210 correspond to a temperature sensor information sensing section. Step S130 corresponds to a conduction path condition judging section.

Figure 4:
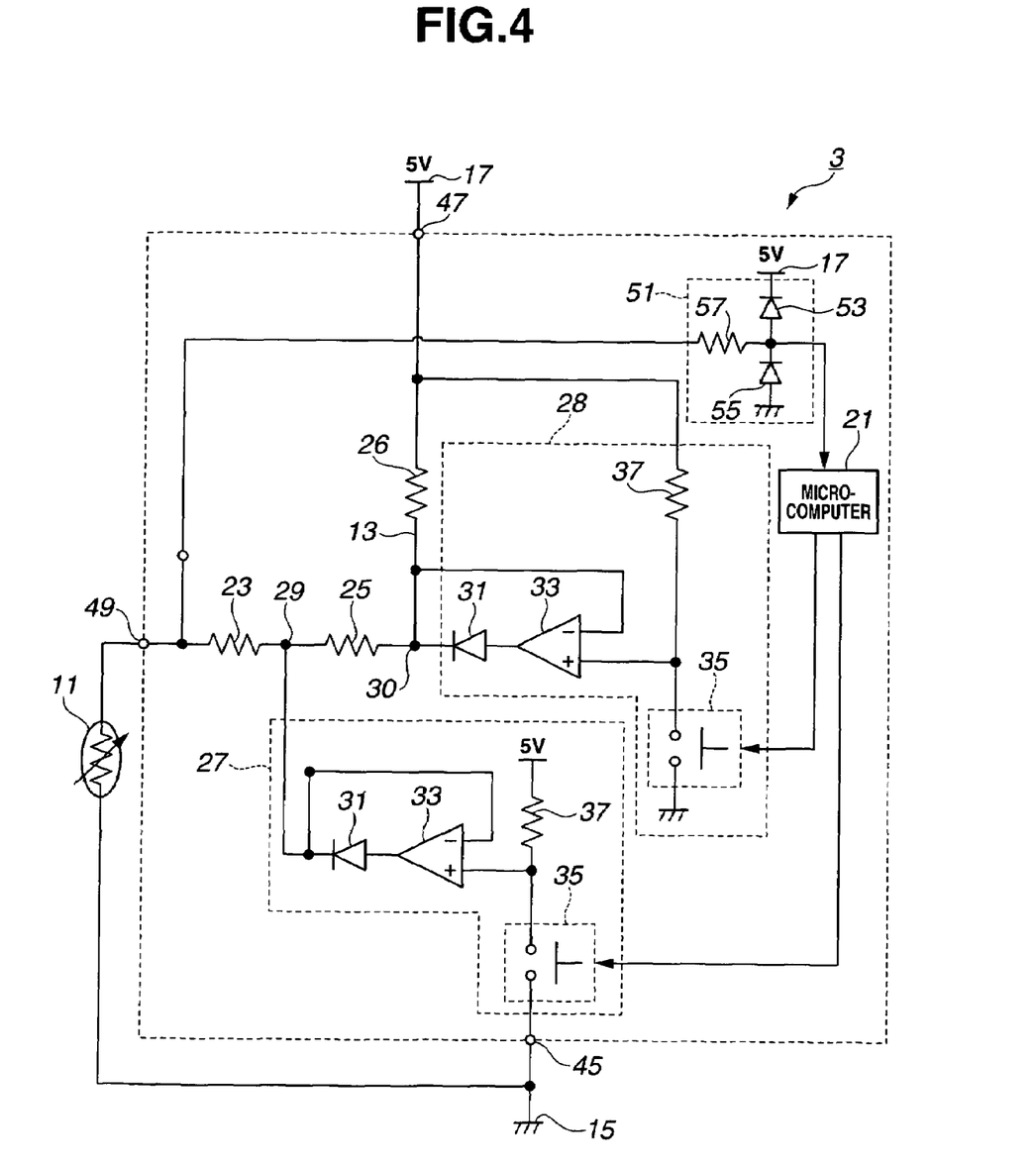
FIG. 4 is a schematic electric circuit diagram showing a second temperature sensor control apparatus with three reference resistance elements, according to a second embodiment of the present invention.

Temperature sensor control apparatus 1 according to the first embodiment has two reference resistance elements, and moreover it is possible to employ three or more reference resistance elements. FIG. 4 is an electric circuit diagram showing a schematic configuration of a second temperature sensor control apparatus 3 including three reference resistance elements (a first reference resistance element 23, a second reference resistance element 25, and a third reference resistance element 26), and according to a second embodiment of the present invention.

Second temperature sensor control apparatus 3 includes third reference resistance element 26, a second potential setting circuit 28, and a second potential-controlled point 30, dislike temperature sensor control apparatus 1 according to the first embodiment. Moreover, second temperature sensor control apparatus 3 has a control process different from the control process of temperature sensor control apparatus 1.

That is, third reference resistance element 26 is disposed between second reference resistance element 25 and driving potential terminal 47 to be connected in series with second reference resistance element 25 and drive potential terminal 47. Second potential-controlled point 30 is disposed between third reference resistance element 26 and second reference resistance element 25. The structure of second potential setting circuit 28 is identical to the structure of potential setting circuit 27. Second potential setting circuit 28 can forcibly switch the electric potential of second potential-controlled point 30 to the driving electric potential (5 [V]) based on a command signal from microcomputer 21.

In temperature sensor control apparatus 3 according to the second embodiment, first reference resistance element 23 is composed of a resistance element of 300 [Ω], second reference resistance element 25 is composed of a resistance element of 15 [kΩ], and third reference resistance element 26 is composed of a resistance element of 5 [MΩ].

Second temperature sensor control apparatus 3 sets the electric potential of potential-controlled point 29 and the electric potential of second potential-controlled point 30 by potential setting circuit 27 and second potential setting circuit 28, respectively. Thereby, second temperature sensor control apparatus 3 changes the number of the reference resistance elements of the three reference resistance elements (first reference resistance element 23, second reference resistance element 25, and third reference resistance element 26) which divides the voltage with respect to temperature sensor 11 by the energization.

First, each of the electric potentials of potential-controlled point 29 and second potential-controlled point 30 is set to the arbitrary state, and consequently the electric current flows through all of the three reference resistance elements. The number of the reference resistance elements dividing the voltage with respect to temperature sensor 11 is set to three (first reference resistance element 23, second reference resistance element 25 and third reference resistance element 26).

Second, the electric potential of potential-controlled point 29 is brought to the arbitrary state, and the electric potential of second potential setting 30 is brought to the fixed potential state. Consequently, the electric current flows through the two reference resistance elements (first reference resistance element 23 and second reference resistance element 25). The number of the reference resistance elements dividing the voltage with respect to temperature sensor 11 is set to two (first reference resistance element 23 and second reference resistance element 25).

Third, each of electric potentials of potential-controlled point 29 and second potential-controlled point 30 is set to the fixed potential state, and the electric current flows through the only one reference resistance element (first reference resistance element 23). The number of the reference resistance elements dividing the voltage with respect to temperature sensor 11 is set to one (first reference resistance element 23).

That is, second temperature sensor control apparatus 3 is arranged to switch the resistance value of the reference resistance elements to the three levels. Accordingly, the temperature region which can be sensed by temperature sensor 11 is divided to three, and each of the resistance values of the reference resistance elements is set to an appropriate value. Thereby, it is possible to accurately sense the divided voltage of temperature sensor 11 and the abnormal condition of wiring, and to improve the accuracy of the temperature detection.

Microcomputer 21 of second temperature sensor control apparatus 3 has two maps including a low temperature sensing map (0~400 [° C.]) and a high temperatures sensing map (400~1000 [° C.]) which are data for judgment for electric potential Vd of temperature sensor connection terminal 49 (the divided voltage of temperature sensor 11), and which show relationship between electric potential Vd of temperature sensor connection terminal 49 (the divided voltage across temperature sensor 11) and the temperature of temperature sensor 11. Microcomputer 21 further includes a determining value for sensing the abnormal condition (a determining value showing the normal region at step S330) which is data for judgment for electric potential Vd of temperature sensor connection terminal 49 (the divided voltage of temperature sensor 11).

Figure 5:
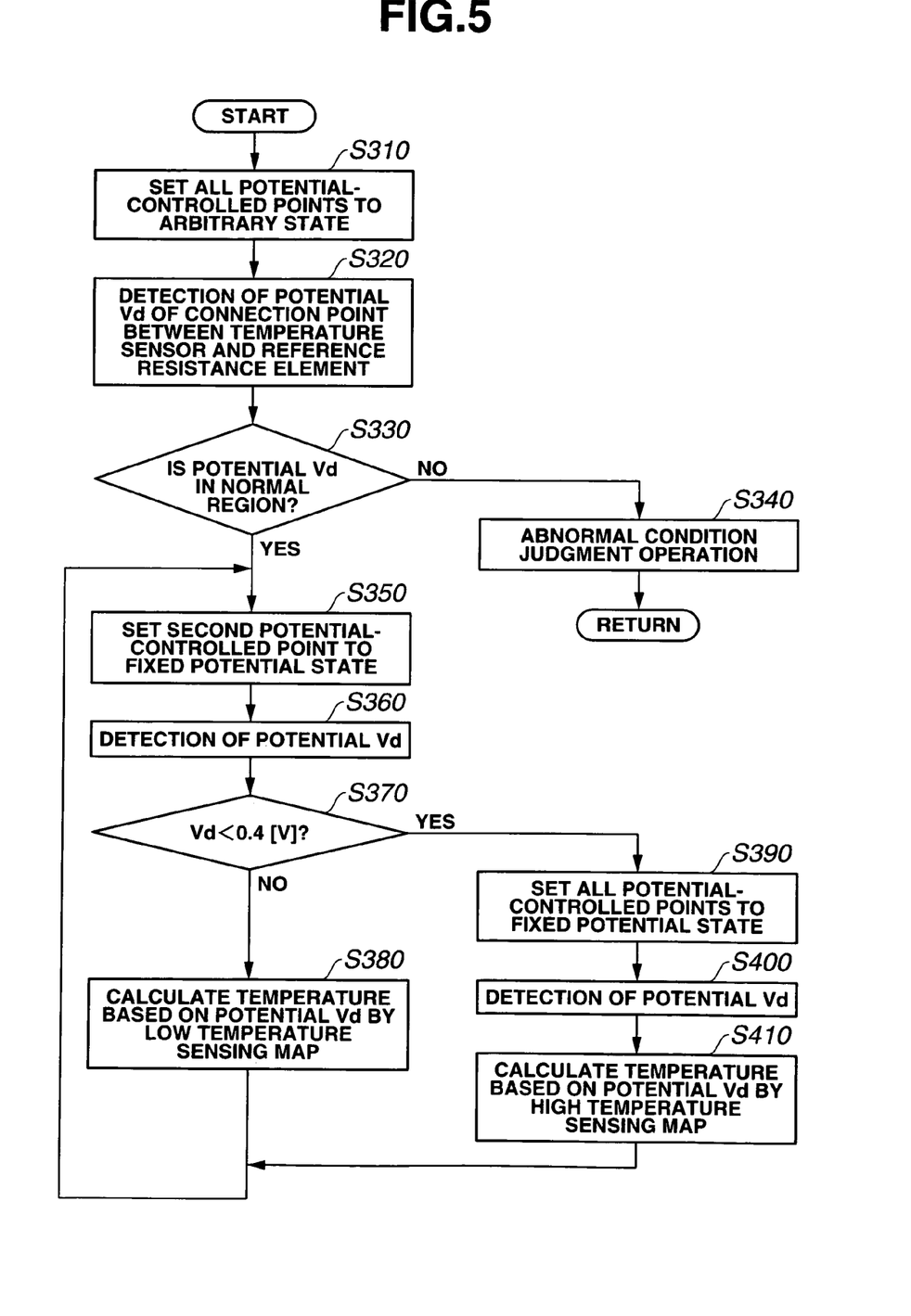
FIG. 5 is a flow chart showing a temperature sensing main control process performed by the second temperature sensing control apparatus of FIG. 4.

FIG. 5 is a flow chart showing a temperature detection main process performed by microcomputer 21 of second temperature sensor control apparatus 3. After the start of the temperature sensing main control process, microcomputer 21 of second temperature sensor control apparatus 3 performs an operation to set the electric potentials of all of the potential-controlled points (potential-controlled point 29 and second potential-controlled point 30) to the arbitrary state at step S310. That is, microcomputer 21 outputs, to potential setting circuit 27 and second potential setting circuit 28, command signals to set the respective potential setting switches 35 to the conduction state.

At step S320, microcomputer 21 performs an operation to sense electric potential Vd of temperature sensor connection terminal 49 (that is, electric potential Vd of the connection point of temperature sensor 11 and first reference resistance element 23). The operation at step S320 is identical to the operation at step S120 of the temperature sensor control apparatus according to the first embodiment.

At step S330, microcomputer 21 judges whether electric potential Vd of temperature sensor connection terminal 49 (electric potential Vd of the connection point between temperature sensor 11 and first reference resistance element 23) is in a predetermined normal range or not. Microcomputer 21 makes an affirmative judgment (YES) in a case in which electric potential Vd is in the normal region, the process proceeds to step S350. Microcomputer 21 makes a negative judgment (NO) in a case in which electric potential Vd is out of the normal region, the process proceeds to step S340.

The operation at step S330 is identical to the operation at step S130 of the temperature sensor control apparatus according to the first embodiment. Subsequently to the negative judgment at step S330, microcomputer 21 determines the abnormal condition of conduction path 13, and performs an operation to inform the user of second temperature sensor control apparatus 3 of the abnormal condition of conduction path 13 at step S340.

The operation at step S340 is identical to the operation at step S140 of the temperature sensor control apparatus according to the first embodiment. Subsequently to the affirmative determination at step S330, microcomputer 21 performs an operation to set the electric potential of second potential-controlled point 30 to the fixed potential state at step S350. That is, microcomputer 21 outputs a command signal to set potential setting switch 35 of second potential setting circuit 28 to the breaking state. Besides, potential-controlled point 29 is set to the arbitrary state.

In this way, the electric potential of potential-controlled point 29 is set to the arbitrary state, the electric potential of second potential-controlled point 30 is the fixed potential state, and consequently the electric current flows through the two reference resistance elements (first reference resistance element 23 and second reference resistance element 25). The number of the reference resistance elements dividing the voltage with respect to temperature sensor 11 is set to two (first reference resistance element 23 and second reference resistance element 25).

At step S360, microcomputer 21 performs an operation to sense electric potential Vd of temperature sensor connection terminal 49 (that is, electric potential Vd of the connection point between temperature sensor 11 and first reference resistance element 23). The operation at step S360 is identical to the operation at step S120 of the temperature sensor control apparatus according to the first embodiment.

At step S370, microcomputer 21 judges whether electric potential Vd sensed at step S360 is smaller than 0.4 [V] or not. Microcomputer 21 makes an affirmative judgment (YES) in a case in which electric potential Vd sensed at step S360 is smaller than 0.4 [V], the process proceeds to step S390. Microcomputer 21 makes a negative judgment (NO) in a case in which electric potential Vd is equal to or greater than 0.4 [V], the process proceeds to step S380.

Subsequently to the negative judgment at step S370, microcomputer 21 calculates the temperature based on electric potential Vd sensed at step S360 by using the low temperature sensing map. The low temperature sensing map shows a relationship between electric potential Vd and the temperature of temperature sensor 11, like the temperature sensor control apparatus according to the first embodiment. In the temperature sensor according to the second embodiment, the temperature region which can be sensed by using the low temperature sensing map is the temperature region of 0~400 [° C.].

Subsequently to the positive judgment at step S370, microcomputer 21 performs an operation to set all of the potential-controlled points (potential-controlled point 29 and second potential-controlled point 30) to the fixed potential state. That is, microcomputer 21 outputs a command signal to set each potential setting switch 35 of potential setting circuit 27 and second potential setting circuit 28, to the breaking state.

In this way, the electric potentials of potential-controlled point 29 and second potential-controlled point 30 are brought to the fixed potential state, and the electric current flows through one reference resistance element (first reference resistance element 23). Consequently, the number of the reference resistance elements dividing the voltage with respect to temperature sensor 11 is set to one (first reference resistance element 23).

At step S400, microcomputer 21 performs an operation to sense electric potential Vd of temperature sensor connection terminal 49. The operation of at step S400 is identical to the operation at step S120 of the temperature sensor control apparatus according to the first embodiment. At step 410, microcomputer 21 calculates the temperature based on electric potential Vd sensed at step S400 by using the high temperatures sensing map.

The high temperature sensing map shows relationship between electric potential Vd of temperature sensor 49 and the temperature of temperature sensor 11, like the high temperature sensing map of the temperature sensor control apparatus according to the first embodiment. In the temperature sensor according to the second embodiment, the temperature region which can be sensed by using the high temperature sensing map is the temperature region of 400~1000 [° C.].

The temperature sensed at step S380 or step S410 are stored in a memory section (such as a memory) of microcomputer 21, and are used for various operations. The temperature stored in the memory section is updated at every operation of step S380 or step S410.

After the operation at step S380 or step S410, the process returns to step S350. Then, microcomputer 21 repeats the operations of step S350 or later, to repeat the temperature sensing operation by using temperature sensor 11.

As illustrated above, second temperature sensor control apparatus 3 can decrease the resistance value of the reference resistance elements which divides the voltage with temperature sensor 11, by changing the number of the reference resistance elements, and thereby increase the electric current flowing through temperature sensor 11. Therefore, it is possible to decrease the effect of the noise, even in the region in which the detection error tends to be incurred by the effect of the noise at the temperature detection which is performed by using variation in the resistance of temperature sensor 11.

Second temperature sensor control apparatus 3 has a structure in which the switching section (the change-over switch) is not connected in series with temperature sensor 11 (that is, a structure in which the switching section (the change-over switch) is not disposed in conduction path 13), and the electric current flowing through temperature sensor 11 does not flow through the switching section (the change-over switch) at the detection of the temperature. Accordingly, it is possible to prevent the variation in the resistance dividing the voltage, by the effect of impedance of the switching section at the detection of the divided voltage of temperature sensor 11.

Accordingly, in the second temperature sensor control apparatus 3, it is possible to prevent reduction in the detection accuracy of the temperature detection because the detection error is not caused by the effect of the switching section (the change-over switch) at the detection of electric potential Vd of temperature sensor 49.

In the second temperature sensor control apparatus 3, the resistance value of the reference resistance elements can be set to three levels, and it is possible to set (adjust) the resistance value of the reference resistance in fine increments, relative to the temperature sensor control apparatus according to the first embodiment. In particular, the reference resistance elements at the start of the temperature sensor include third reference resistance element 26 (5[MΩ]) which has the extremely large resistance value. Accordingly, even in a case in which the electric resistance of temperature sensor 11 becomes extremely large, it is possible to prevent the extreme increase in electric potential Vd of temperature sensor connection terminal 49 (that is, the divided voltage value of temperature sensor 11).

In this way, second temperature sensor control apparatus 3 can set the resistance value of the reference resistance elements to the extreme large value. Accordingly, it is possible to sense electric potential Vd of temperature sensor connection terminal 49 (that is, the divided voltage of temperature sensor 11) adequately, even in the cold region in which the electric resistance of temperature sensor 11 (the temperature sensor having the negative characteristic) becomes extreme large. Therefore, it is possible to accurately judge the development of the abnormal condition of conduction path 13 including temperature sensor 11 immediately after the start of temperature sensor control apparatus, relative to the temperature sensor control apparatus according to the first embodiment.

The temperature sensor is not limited to the temperature sensor with the negative characteristic, and it is possible employ the temperature sensor with the positive characteristic whose electric resistance is increased as the temperature increases. In this case, it is necessary to use a map corresponding to the positive characteristic of the temperature sensor, and to adequately provide a step for judging the temperature region. Thereby, it is possible to detect the temperature accurately.

The calculation processing (arithmetic processing) of the temperature performed by using divided voltage Vd of the temperature sensor (the electric potential of the connection point between the temperature sensor and the reference resistance element) as a parameter is not limited to the calculation by the map. Moreover, it is possible to employ calculation processing which uses calculating formulas capable of calculating the temperature by assigning divided voltage value Vd.

Moreover, the number of the reference resistance elements is not limited to two or three, and it is possible to employ four or more reference resistance elements. In this case, appropriate number of the potential-controlled points and appropriate number of the potential setting sections are provided in accordance with the number of the reference resistance elements, and thereby the temperature sensor control apparatus is arranged to switch the resistance of the reference resistance elements serving as the resistance dividing the voltage with respect to the temperature sensor. The resistance switching section sets all of the potential-controlled points to the arbitrary state, and the general temperature of the measured fluid is determined based on the divided voltage value of the temperature sensor which is sensed in that state. The potential setting section is controlled to adjust the resistance of the reference resistance elements to a resistance appropriate for determining the general temperature, and each of the potential setting points is set to an appropriate state.

Moreover, each resistance value of the reference resistance elements is not limited to the above mentioned value. It is possible to set each resistance value of the reference resistance elements in accordance with uses, and to improve the detection accuracy of the temperature detection.

The temperature sensor control apparatus according to the embodiments includes the reference potential section 45 set to the reference electric potential; the driving potential section 47 set to the driving electric potential different from the reference electric potential; the temperature sensor 11 configured to vary the resistance in accordance with the temperature of the fluid, and disposed between the reference potential section 45 and the driving potential section 47 for being energized; the conduction path 13 extending from the driving potential section 47 through the temperature sensor 11 to the reference potential section 45; at least two reference resistance elements (23, 25, 26) each disposed in the conduction path 13 to be connected in series with the temperature sensor 11; the potential controlled point 29 disposed in the conduction path 13 between the reference resistance elements (23, 25, 26); the potential setting section 27 configured to set an electric potential of the potential controlled point 29 to the driving electric potential; and the resistance switching control section 21 configured to control the potential setting section 27 to switch the electric potential of the potential controlled point 29, and to switch each of the reference resistance elements (23, 25, 26) to one of the energized state and the deenergized state.

This temperature sensor control apparatus is configured to switch the potential-controlled point provided in the conduction path to the driving electric potential, and thereby to switch the energized reference resistance element of the reference resistance elements. That is, the electric potential of the potential-controlled point is set to the driving electric potential, and the reference resistance element through which the electric current flows is limited to the reference resistance element disposed between the potential-controlled point and the reference potential section.

In this way, in the temperature sensor control apparatus according to the invention switches the electric potential of the potential-controlled point to the driving electric potential, and it is possible to change the number (resistance value) of the reference resistance elements dividing the voltage with the temperature sensor. Accordingly, it is possible to decrease the resistance value by changing the number of the reference resistance elements dividing the voltage with the temperature sensor, and thereby to increase the current value flowing through the temperature sensor. Therefore, it is possible to decrease the effect of the noise at the temperature detection which is performed by using the variation in the resistance, even in the temperature region in which the detection error tends to incurred by the influence of the noise.

In particular, in this temperature sensor control apparatus, the switching section (the change-over switch) to change the resistance value of the reference resistance elements is not provided in the conduction path, and thereby the impedance of the switching section (the change-over switch) does not affect the voltage dividing by the temperature sensor and the reference resistance elements. That is, it is possible to prevent the development of the variation in the resistance value of the reference resistance elements dividing the voltage, by the influence of the impedance of the switching section (the change-over switch), at the detection of the electric potential (the divided voltage value) of the connection point between the temperature sensor and the reference resistance element which is performed by the voltage dividing.

Accordingly, it is possible to prevent false detection of the electric potential (the divided voltage value) of the connection point between the temperature sensor and the reference resistance element for the influence of the impedance of the switching section (the change-over switch). Therefore, in the temperature sensor control apparatus according to the present invention, it is possible to prevent the decrease in the detection accuracy at the temperature detection which is performed by the temperature sensor by changing the number (the resistance value) of the reference resistance elements connected in series with the temperature sensor.

In the temperature sensor control apparatus according to the present invention, the potential setting section 27 includes the setting diode 31 having the anode and a cathode connected with the potential controlled point 29, the operational amplifier 33 having an output terminal connected with the anode of the setting diode 31, the inverting input terminal (−) connected with the cathode of the setting diode 31, and the non-inverting input terminal (+), a setting resistance element 37 disposed between the non-inverting input terminal (+) of the operational amplifier 33 and the driving potential section 47, and a potential setting switching section 35 configured to set the electrical connection state between the non-inverting input terminal (+) of the operational amplifier 33 and the reference potential section 45, to one of the conduction state and the breaking state.

In the potential setting section, when the potential setting switching section sets the non-inverting input terminal of the operational amplifier and the reference potential section to the conduction state, the driving potential section is electrically connected with the reference potential section through the potential setting switching section and the setting resistance element, and the reference electric potential is inputted to the non-inverting input terminal of the operational amplifier. In this state, the inverting input terminal of the operation amplifier receives the electric potential of the cathode of the setting diode (that is, the electric potential of the potential-controlled point in the conduction path (which is greater than the electric potential of the reference electric potential)). Consequently, the operational amplifier outputs, from the output terminal, the electric potential lower than the electric potential of the potential-controlled point.

In the case in which the operational amplifier outputs, from the output terminal, the electric potential lower than the electric potential of the electric potential of the potential-controlled point in this way, the setting diode resists the electric current flowing from the potential-controlled point to the output terminal of the operational amplifier. Accordingly, the electric potential of the potential-controlled point is set based on the voltage divided by the reference resistance elements and the temperature sensor, without receiving the influence of the potential setting section.

When the potential setting switching section sets the non-inverting input terminal of the operational amplifier and the reference potential section to the breaking state, the driving electric potential is inputted to the non-inverting input terminal of the operational amplifier. In this state, the operational amplifier outputs the voltage from the output terminal so that the electric potential of the potential-controlled point connected with the inverting input terminal becomes the driving electric potential.

Consequently, in the reference resistance elements, the electric current does not flow through the reference resistance element disposed between the driving potential section and the potential-controlled point set to the driving electric potential, and flows through the reference resistance element disposed between the reference potential section and the potential-controlled point set to the driving electric potential. That is, the electric current flows through the reference resistance elements and the temperature sensor which are disposed between the reference potential section and the potential-controlled point set to the driving electric potential. The electric current does not flow through all of the reference resistance elements, and flows though a part of the reference resistance elements.

By using the potential setting section in this way, it is possible to switch the electric potential of the potential-controlled point, to change the number of the reference resistance elements applied with the electric current, and to vary the resistance value of the reference resistance elements serving as the resistances dividing the voltage with respect to the temperature sensor.

By the way, the temperature sensor control apparatus according to the present invention can be used for the temperature detection of the exhaust gas of the internal combustion engine. In recent years, the temperature sensor control apparatus for the internal combustion engine performs the detection of the abnormal (failure) condition of the temperature sensor of an OBD system (On-Board Diagnostic systems). Accordingly, it is required to accurately sense the broken wire or short circuit of the temperature sensor at the start of the temperature sensor control apparatus.

In the operation for detecting the abnormal condition of the temperature sensor, when the breaking occurs in the conduction path including the temperature sensor, the electric potential of the connection point between the temperature sensor and the reference resistance element becomes the high electric potential (for example, the driving electric potential). Accordingly, it is possible to sense whether the abnormal condition is generated in the conduction path including the temperature sensor or not, by sensing the electric potential of the connection point.

However, in the temperature sensor having negative characteristic in which the resistance value is decreased as the temperature increases, the resistance value of the temperature sensor is extremely high (for example, a few megohms [MΩ] ~a few tens megohms [MΩ]) in the low temperature condition (−40 [° C.]~0 [° C.]). Therefore, the electric potential of the connection point between the temperature sensor and the reference resistance element becomes high. Accordingly, in a case in which the temperature sensor control apparatus for controlling the temperature sensor with the negative characteristic is started in the cold region, it is difficult to accurately judge whether the divided voltage value (the connection electric potential) of the temperature sensor indicates the high electric potential for the appearance of the abnormal condition of the conduction path, or indicates the high electric potential for the extreme highness of the resistance value though the conduction path is the normal condition.

In the temperature sensor control apparatus according to the present invention, the temperature sensor 11 has the negative characteristic in which the resistance is decreased as the temperature of the fluid is increased. The temperature sensor control apparatus further includes the start voltage applying section S110 configured to apply the driving voltage corresponding to the potential difference between the reference potential section 45 and the driving potential section 47, to the series circuit including the temperature sensor 11 and the reference resistance elements (23, 25, 26), at the start of the temperature sensor control apparatus. The temperature sensor control apparatus includes the conduction path condition judgment section S130 configured to judge whether the electric potential of the connection point between the temperature sensor 11 and the one of the reference resistance elements (23, 25, 26) is in the predetermined region or not, to determine the normal condition of the conduction path 13 when the electric potential of the connection point is in the predetermined region, and to determine the abnormal condition of the conduction path 13 when the electric potential of the connection point is out of the predetermined region.

That is, the driving voltage is applied to the series circuit including the temperature sensor and all the reference resistance elements at the start of the temperature sensor control apparatus, and accordingly it is possible to decrease the divided voltage value across the temperature sensor, relative to the case in which the driving voltage is applied to the series circuit including the temperature sensor and a part of the reference resistance elements.

Accordingly, it is possible to accurately sense the appropriate divided voltage of the temperature sensor at the start of the temperature sensor control apparatus without becoming the high voltage value, even when the resistance value of the temperature sensor with the negative characteristic becomes the high resistance value, except for the case in which the conductive path including the temperature sensor is in the abnormal condition.

When the series circuit (that is, the conduction path) including the temperature sensor and the reference resistance elements is in the abnormal condition (such as the breaking and the short circuit), the divided voltage across the temperature sensor (that is, the electric potential of the connection point between the temperature sensor and the reference resistance element) becomes the abnormal value.

When the conduction path including the temperature sensor is in the breaking abnormal condition or the short circuit abnormal condition in which the conduction path including the temperature sensor is short-circuited to the battery power supply, the electric potential of the connection point between the temperature sensor and the reference element becomes the high electric potential (the driving electric potential or the battery output electric potential). Moreover, in the ground short circuit abnormal condition in which the conduction path including the temperature sensor is short-circuited with the ground electric potential, the electric potential of the connection point between the temperature sensor and the reference resistance element becomes equal to 0 [V].

In the temperature sensor control apparatus according to the present invention, even in the case in which the temperature sensor with the negative characteristic indicates the high resistance value in the low temperature, the divided voltage value of the temperature sensor does not become the high voltage, and is sensed in the appropriate voltage region (the normal region), except for the case in which the conduction path including the temperature sensor is in the abnormal condition. Accordingly, the temperature sensor control apparatus according to the present invention can appropriately judge whether the conduction path is the normal condition or the abnormal condition by judging whether the electric potential (the electric potential of the connection point between the temperature sensor and the reference resistance element) sensed by the sensor information sensing section is in the normal region or not.

Accordingly, in the temperature sensor control apparatus according to the present invention can accurately judge the state of the conduction path including the temperature sensor at the start of the temperature sensor control apparatus.

This application is based on a prior Japanese Patent Application No. 2005-251856. The entire contents of the Japanese Patent Application No. 2005-251856 with a filing date of Aug. 31, 2005 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A temperature sensor control apparatus comprising:
   a reference potential section set to a reference electric potential;
   a driving potential section set to a driving electric potential different from the reference electric potential;
   a temperature sensor configured to vary a resistance in accordance with a temperature of a fluid, and disposed between the reference potential section and the driving potential section for being energized;
   a conduction path extending from the driving potential section through the temperature sensor to the reference potential section;
   at least two reference resistance elements each disposed in the conduction path to be connected in series with the temperature sensor;
   a potential controlled point disposed in the conduction path between the reference resistance elements;
   a potential setting section configured to set an electric potential of the potential controlled point to the driving electric potential; and
   a resistance switching control section configured to control the potential setting section to switch the electric potential of the potential controlled point, and to switch each of the reference resistance elements to one of an energized state and a deenergized state.

2. The temperature sensor control apparatus as claimed in claim 1, wherein the potential setting section includes a setting diode having an anode and a cathode connected with the potential controlled point, an operational amplifier having an output terminal connected with the anode of the setting diode, an inverting input terminal connected with the cathode of the setting diode, and a non-inverting input terminal, a setting resistance element disposed between the non-inverting input terminal of the operational amplifier and the driving potential section, and a potential setting switching section configured to set an electrical connection state between the non-inverting input terminal of the operational amplifier and the reference potential section, to one of a conduction state and a breaking state.

3. The temperature sensor control apparatus as claimed in claim 1, wherein the temperature sensor control apparatus further comprises a start voltage applying section configured to apply a driving voltage corresponding to a potential difference between the reference potential section and the driving potential section, to a series circuit including the temperature sensor and the reference resistance elements, at a start of the temperature sensor control apparatus.

4. The temperature sensor control apparatus as claimed in claim 3, wherein the temperature sensor control apparatus further comprises a temperature sensor information sensing section configured to sense the electric potential of a connection point between the temperature sensor and one of the reference resistance elements adjacent to the temperature sensor, at the application of the driving voltage.

5. The temperature sensor control apparatus as claimed in claim 4, wherein the temperature sensor control apparatus further comprises a conduction path condition judgment section configured to judge whether the electric potential of the connection point between the temperature sensor and the one of the reference resistance elements is in a predetermined region or not, to determine a normal condition of the conduction path when the electric potential of the connection point is in the predetermined region, and to determine an abnormal condition of the conduction path when the electric potential of the connection point is out of the predetermined region.

6. The temperature sensor control apparatus as claimed in claim 1, wherein the temperature sensor has a negative characteristic in which a resistance is decreased as the temperature of the fluid is increased.

7. The temperature sensor control apparatus as claimed in claim 1, wherein the at least two reference resistance elements are a first reference resistance element and a second reference resistance element, respectively; the potential setting section is a first potential setting section; the potential controlled point is a first potential controlled point disposed between the first reference resistance element and the second reference resistance element; and the first resistance element is disposed between the temperature sensor and the second reference resistance element.

8. The temperature sensor control apparatus as claimed in claim 7, wherein the second reference resistance element has a resistance value greater than a resistance value of the first reference resistance element.

9. The temperature sensor control apparatus as claimed in claim 7, wherein the temperature sensor control apparatus further comprises a third reference resistance element disposed in the conduction path to be connected in series with the temperature sensor, a second potential controlled point disposed between the second reference resistance element and the third reference resistance element, and a second potential setting section configured to set an electric potential of the second potential controlled point to the driving electric potential; the second reference resistance element is disposed between the first reference resistance element and the third reference resistance element; and the resistance switching control section is configured to control the first potential setting section and the second potential setting section to switch the electric potentials of the first potential controlled point and the second potential controlled point respectively, and to switch the reference resistance elements to one of the energized state and the deenergized state.

10. The temperature sensor control apparatus as claimed in claim 9, wherein each of the first potential setting section and the second potential setting section includes a setting diode having an anode and a cathode connected with the corresponding one of the first potential controlled point and the second potential controlled point, an operational amplifier having an output terminal connected with the anode of the setting diode, an inverting input terminal connected with the cathode of the setting diode, and a non-inverting input terminal, a setting resistance element disposed between the non-inverting input terminal of the operational amplifier and the driving potential section, and a potential setting switching section configured to set an electrical connection state between the non-inverting input terminal of the operational amplifier and the reference potential section, to one of a conduction state and a breaking state.

11. The temperature sensor control apparatus as claimed in claim 9, wherein the third reference resistance element has a resistance value greater than a resistance value of the second reference resistance element; and the second reference resistance element has a resistance value greater than a resistance value of the first reference resistance element.

12. The temperature sensor control apparatus as claimed in claim 1, wherein the temperature sensor control apparatus further comprises a plurality of the reference resistance elements, a plurality of the potential controlled points each disposed between adjacent two of the reference resistance elements, and a plurality of the potential setting sections each configured to set an electric potential of one of the potential controlled points to the driving electric potential; and the resistance switching control section is configured to control each of the potential setting sections to switch the electric potential of the one of potential controlled points, and to switch the reference resistance elements to one of the energized state and the deenergized state.

13. The temperature sensor control apparatus as claimed in claim 12, wherein each of the potential setting sections includes a setting diode having an anode and a cathode connected with the one of the potential controlled points, an operational amplifier having an output terminal connected with the anode of the setting diode, an inverting input terminal connected with the cathode of the setting diode, and a non-inverting input terminal, a setting resistance element disposed between the non-inverting input terminal of the operational amplifier and the driving potential section, and a potential setting switching section configured to set an electrical connection state between the non-inverting input terminal of the operational amplifier and the reference potential section, to one of a conduction state and a breaking state.

14. The temperature sensor control apparatus as claimed in claim 1, wherein the temperature sensor is disposed between the reference potential section and the reference resistance elements.

* * * * *